(12) United States Patent
Baer

(10) Patent No.: US 6,536,730 B1
(45) Date of Patent: Mar. 25, 2003

(54) LIGHT STRAND HANGER

(76) Inventor: Walter L. Baer, 5925 Havilland La., Riverside, CA (US) 92504

( * ) Notice: Subject to any disclaimer, the term of this patent is extended or adjusted under 35 U.S.C. 154(b) by 0 days.

(21) Appl. No.: 09/878,662

(22) Filed: Jun. 11, 2001

Related U.S. Application Data
(60) Provisional application No. 60/226,115, filed on Aug. 18, 2000.

(51) Int. Cl.$^7$ .................................................. F16B 45/00
(52) U.S. Cl. ......................... 248/304; 248/58; 248/339; 362/249
(58) Field of Search ................................ 248/200, 301, 248/339, 304, 231.9, 231.91, 58, 63; 362/396, 249

(56) References Cited

U.S. PATENT DOCUMENTS

| | | | |
|---|---|---|---|
| 1,373,421 A | * | 4/1921 | Graham |
| 2,775,422 A | * | 12/1956 | Von Herbulis et al. ........ 248/63 |
| 3,358,953 A | * | 12/1967 | Bethea, Jr. .................... 248/74 |
| 4,026,510 A | * | 5/1977 | Holmes ........................ 248/493 |
| D302,655 S | * | 8/1989 | Sachs ........................... D8/396 |
| 4,895,094 A | * | 1/1990 | Carlstedt ..................... 114/218 |
| 5,141,192 A | | 8/1992 | Adams ...................... 248/231.8 |
| 5,249,108 A | | 9/1993 | Gary ........................... 362/388 |
| 5,489,078 A | | 2/1996 | Risley ..................... 248/231.81 |
| D368,424 S | * | 4/1996 | Morey .......................... D8/373 |
| 5,544,031 A | | 8/1996 | Blanton ....................... 362/396 |
| 5,566,058 A | | 10/1996 | Protz, Jr. .................... 362/396 |
| 5,581,956 A | | 12/1996 | Fennessy et al. .............. 52/28 |
| 5,639,049 A | * | 6/1997 | Jennings et al. ........... 248/74.2 |
| 5,667,177 A | | 9/1997 | Van Leeuwen et al. .... 248/74.2 |
| 5,813,751 A | * | 9/1998 | Shaffer ........................ 362/249 |
| 5,957,819 A | * | 9/1999 | Cortesi ........................ 482/121 |

* cited by examiner

*Primary Examiner*—Anita King
*Assistant Examiner*—Steven Marsh
(74) *Attorney, Agent, or Firm*—Knobbe, Martens, Olson & Bear, LLP

(57) ABSTRACT

A light strand hanger adapted to allow hanging of light strands on structures such that the light strands are inhibited from twisting. The light strand hanger comprises a first leg defining a first opening and a second leg defining a second opening wherein the opening in the second leg is positioned with respect to the opening in the first leg such that a fastener can be extended through both openings. The first leg is attached to the second leg so as to define a recess therebetween. The light strand hanger is secured to a structure by the fastener, such as a screw, urged through the openings in the first and the second legs. The opening in the second leg is sized to allow the head of the screw and the tip of a screwdriver to pass through such that the screw can be urged through the opening in the first leg wherein the opening in the first leg is sized to be smaller than the head of the screw. To aid the insertion of the light strand into the light strand holder, the second leg is flanged outward and rounded at the end. The rounded end of the second leg also prevents damages to the wires of the light strand during insertion. The recess defined by the first leg and the second leg is sized to receive the light strand such that the light strand is inhibited from twisting by frictional engagement of the light strand with the surfaces of the first and the second legs.

15 Claims, 6 Drawing Sheets

LIGHT STRAND HANGER

RELATED APPLICATIONS

This application claims the benefit of U.S. Provisional Application No. 60/226,115, filed on Aug. 18, 2000.

BACKGROUND OF THE INVENTION

1. Field of the Invention

The present invention relates to light hangers and, in particular, concerns a light hanger that is adapted to permit the hanging of strands of lights, such as Christmas lights.

2. Description of the Related Art

It is extremely common for people to string strands of lights for festive occasions. In this country, strands of lights are typically strung during the holiday periods on houses and buildings to provide a festive atmosphere. Typically, the strands of lights have one or more wires that extend in a long strand with lights periodically spaced along the strand.

Typically, strands of lights are hung on buildings by stapling the strands of wires to the dwelling or positioning hangers onto the building wherein the hangers define a recess that will receive the strand of lights. This allows the light strand to be strung over long distances thereby distributing the strands of lights over a length of the building or surface.

One typical hanger for strands of lights is a screw hook which has hook portion that is attached to a screw member. The hook portion is then used to urge the screw member into a surface, such as a wooden eave surrounding the outside perimeter of the house. While the screw hooks do permit the mounting of strands of lights to surfaces, such as wooden eaves, they suffer from some difficulties.

In particular, the hook member is often sufficiently wide such that it does not prevent the strands of lights from twisting when positioned within the hook opening. Often, the person stringing the strands of lights wants lights to be oriented in a particular direction to obtain the best possible display of lights. If the cord is twisted in the light hangers, it is difficult, if not impossible, to make sure that the lights are hanging in a desired way. This is a difficulty that occurs with many light strand hangers, not just screw hook hangers.

A further difficulty that occurs with screw hook hangers is that the installer screws the screw into the surface while grasping the hook portion of the screw hook. If the surface is hard, it can be difficult to get the screw hook into the surface. Moreover, this type of hanger does not allow the installer to make use of tools like screwdrivers and the like. Thus, the installation process is more difficult using these types of hangers.

Other methods that are used to hang light strands have difficulties as well. One popular method is to staple the light strands directly onto the structure. Stapling can result in a sharp staple damaging the insulating material of the wires. Another method is to use light hangers that attach to shingles or gutters. The problem with such hangers is that their use requires a presence of shingles or gutters. This restriction limits the usefulness of such hangers.

From the foregoing, it will be appreciated that there is a need for an improved light strand hanger that allows for easier installation and is adapted to allow the user to install the light strands so that the lights hang in a desired orientation. To this end, there is a need for a light strand hanger which can be installed using tools, such as screwdrivers, and is also configured to prevent the light strand from twisting in the hanger.

SUMMARY OF THE INVENTION

The aforementioned needs are satisfied by a light strand hanger of the present invention comprised of a first leg attached to a second leg so as to define a recess that is separated by a first distance. The first leg defines a first opening that is sized to receive a fastener such that the fastener can be extended therethrough so as to secure the first leg to a structure. The second leg defines a second opening that is positioned with respect to the opening in the first leg such that the fastener can be extended through the opening in the second leg into the opening of the first leg. The opening in the second leg is sized so as to receive the fastener therethrough and to receive the end of a tool such that the tip of the tool can pass through.

In one aspect of the invention, the fastener is preferably a screw and the tool is a screwdriver. The opening in the first leg is sized such that the threaded portion of the screw can pass through, while the head of the screw cannot so as to allow the first leg to be secured to the structure by the screw. The opening in the second leg is sized such that the head of the screw and the tip of the screwdriver can pass through so as to allow the screw to be urged through the opening in the first leg into the structure. It will be appreciated that use of the screw and the screwdriver allows the light strand hanger to be secured to a variety of surfaces, including hard surfaces.

In another aspect of the invention, the second leg is flanged outward so as to aid in insertion of the light strand into the recess. Furthermore, the tip of the second leg is rounded to prevent snagging of the light strand so as to further aid in the insertion of the light strand and to prevent damages to the wires in the light strand.

In another aspect of the invention, the light strand inserted into the recess is frictionally engaged with the inner surfaces of the first and second legs so as to inhibit the light strand from twisting. It will appreciated that this feature allows a user to urge the light strand into a desirable orientation whereby that orientation is maintained. A plurality of the light strand hangers can be used to orient a plurality of the light strands so as to improve the desired effect of the lights strands attached to the structure. These and other objects and advantages of the present invention will become more fully apparent from the following description taken in conjunction with the accompanying drawings.

DETAILED DESCRIPTION OF THE PREFERRED EMBODIMENT

Figure 1:
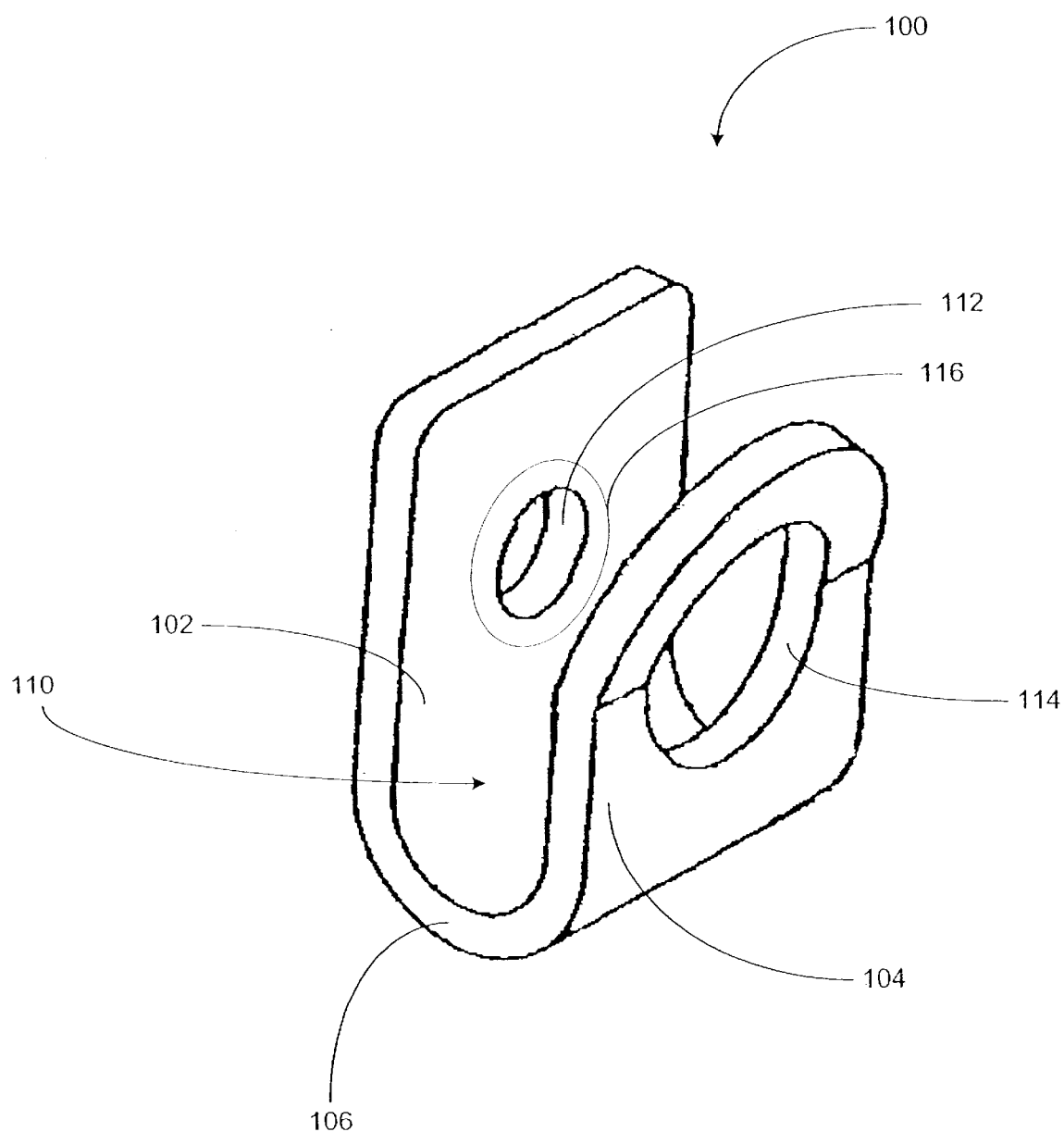
FIG. 1 is a perspective view of one embodiment of the light strand hanger of the present invention.

Reference will now be made to the drawings wherein like numerals refer to like parts throughout. FIG. 1 illustrates a light strand hanger 100 of the present invention. The light strand hanger 100 is formed so as to define a first leg 102 and a second leg 104 with a curved interconnecting section 106 interposed therebetween. The first leg 102 is spaced from the second leg 104 so as to define a recess 110 that receives a light strand 150 (shown in FIG. 5) in a manner that will be described in greater detail hereinbelow.

Figure 2:
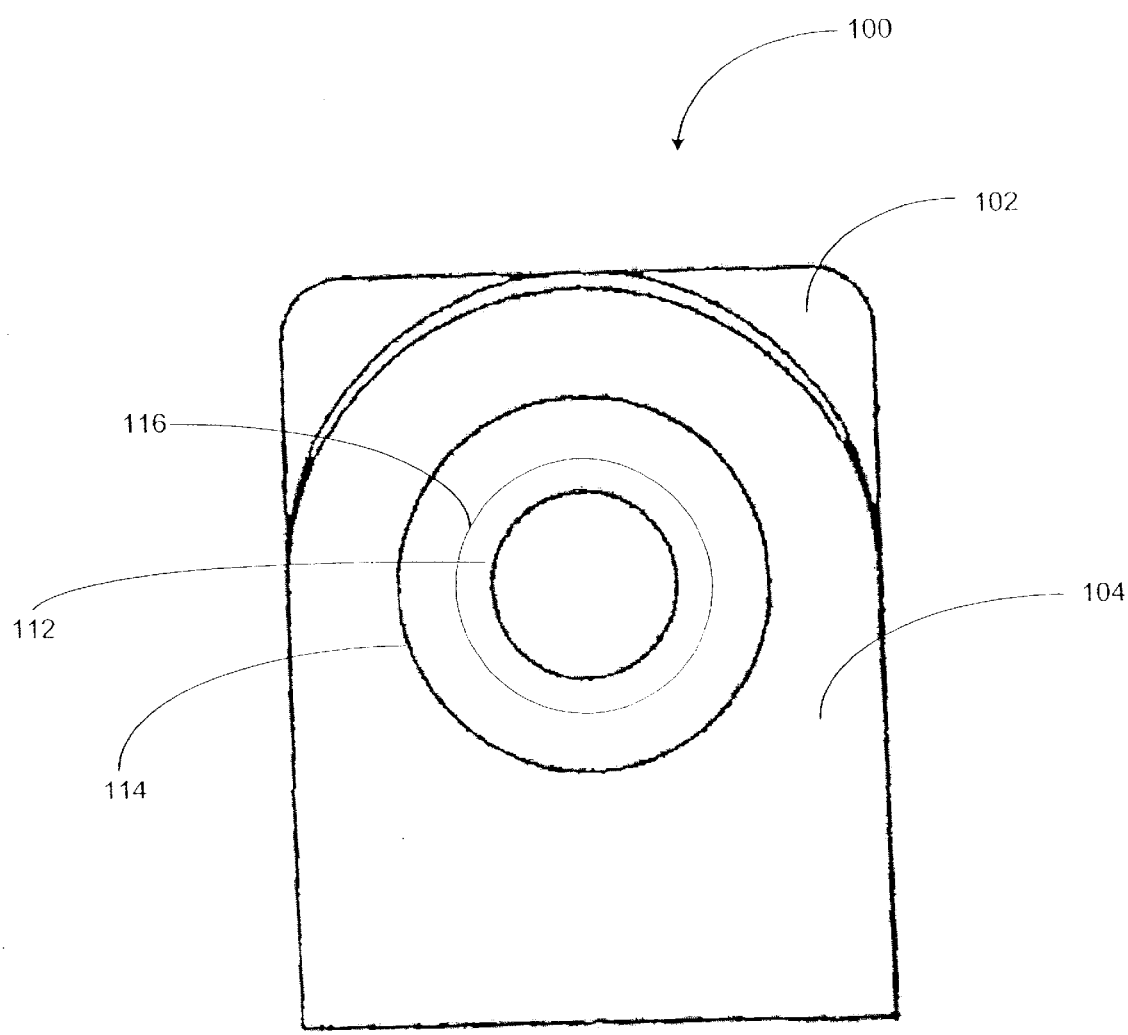
FIG. 2 a front view of the light strand hanger of FIG. 1.

As is illustrated in FIGS. 1 and 2, the first leg 102 of the hanger member 100 includes an opening 112 that is preferably sized to receive a fastener, such as a screw, therethrough. The second leg 104 also includes an opening 114 which is substantially larger than the opening 112 so as to permit a tool, such as a screwdriver, to be extended through the opening 114 to allow the screwdriver to urge the screw through the opening 112 to thereby secure the first leg 102 to a surface, such as the eave of a building. In the preferred embodiment of the present invention, the opening 112 in the first leg 102 is adapted so as to provide a countersink 116, such that the screw can be secured flush with the first leg 102.

Figure 3:
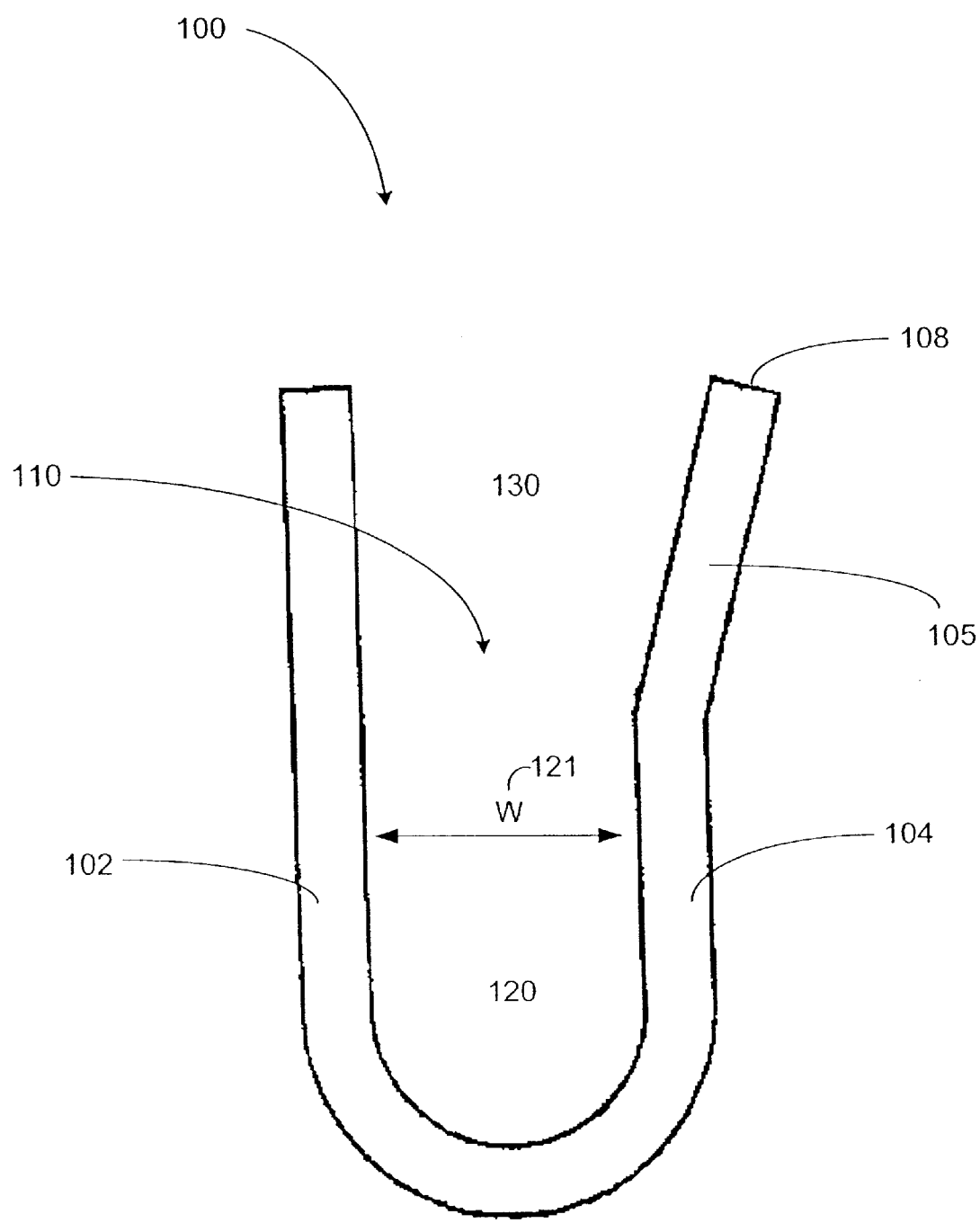
FIG. 3 is a side view of the light strand hanger of FIG. 1.

As is illustrated in FIG. 3, the recess 110 includes a securing section 120 of a generally uniform width W that receives the light strand 150 therein. The width W 121 is preferably dimensioned such that the light strand 150 can be wedged into the securing section 120 of the recess 110 which allows the user to position the light strand 150 within the recess 110 in a manner that inhibits rotation of the light strand 150. This allows the user to hang the light strand 150 in the light strand hanger 100 with the lights 155a (shown in FIG. 5) being hung in a desired orientation.

As is also illustrated in FIG. 3, the second leg 104 includes an outwardly extending section 105 that flanges outward from the opening 110 towards the upper end 108 of the second leg 104. This, in effect, defines an expanded portion 130 of the recess 110. By flanging the second leg 104 outward, installation of the light strand 150 within the recess 110 is facilitated as the expanded region 130 allows for easier positioning of the light strand 150 within the recess 110. Preferably, the outer end 108 of the second leg 104 is rounded to inhibit damage to the light strand 150 during installation.

Figure 4A:
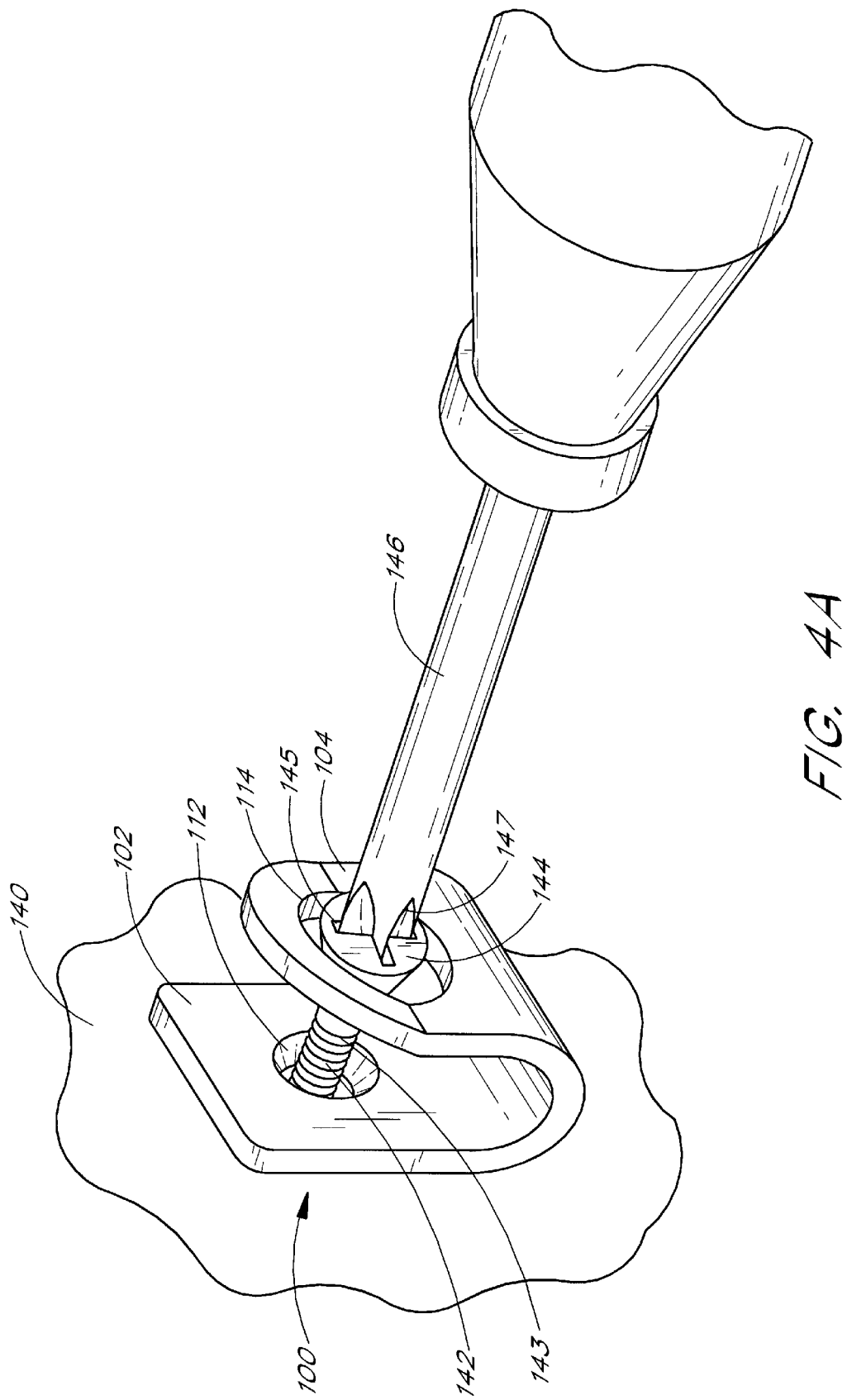
FIG. 4A is a perspective view of the light strand hanger being attached to a mounting surface by a screw and a screwdriver.
Figure 4B:
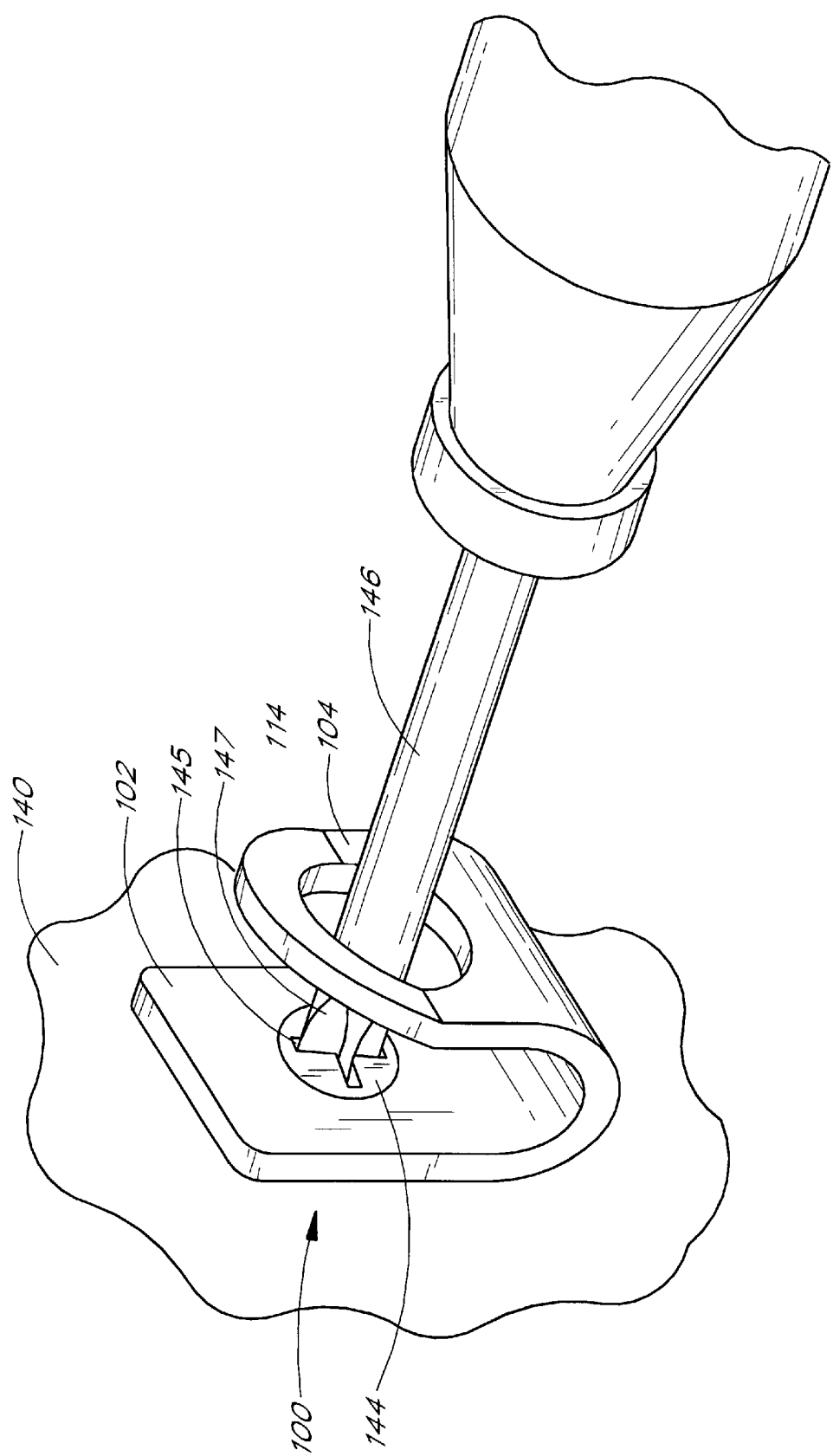
FIG. 4B is a perspective view of the light strand hanger attached to the mounting surface.

FIGS. 4A and 4B illustrate the light strand hanger 100 being secured to a mounting surface 140 using a screw 142. In the preferred embodiment of the invention, the opening 112 in the first leg 102 is sized so as to allow the threaded portion 143 of the screw 142 to pass therethrough. The size of the opening 112 in the first leg 102 does not permit the head 144 of the screw 142 to pass through so as to allow the screw 142 to secure the first leg 102 to the mounting surface 140 when the screw 142 is fully urged such that the head 144 is positioned tightly adjacent to the perimeter of the opening 112. The opening 114 on the second leg 104 is sized so as to allow the screw 142 and the tip 147 of a screwdriver 146 to pass through in a manner of attachment described below.

To urge the screw 142 into the mounting surface 140, the tip 147 of the screwdriver 146 is brought into engagement with a slotted portion 145 of the screw head 144. The screwdriver 146 is rotated such that the engagement of the tip 147 and the slotted portion 145 forces the screw 142 to also rotate so as to make the screw 142 move into the mounting surface 140. The screw 142 moves into the mounting surface 140 until the screw head 144 comes in contact with the first leg 102, at which point the screw 142 is fully engaged, and the light strand hanger 100 is secured to the mounting surface 140. In the preferred embodiment of the present invention, the screw 142 has a flat head that is tapered on the thread side such that when fully engaged with the first leg 102, the countersink 112 allows the screw head to be flush with the first leg 102. The opening 114 on the second leg 104 allows both the screw 142 and the screwdriver tip 147 to pass through in a substantially straight manner to facilitate proper use of the screw 142.

Figure 5:
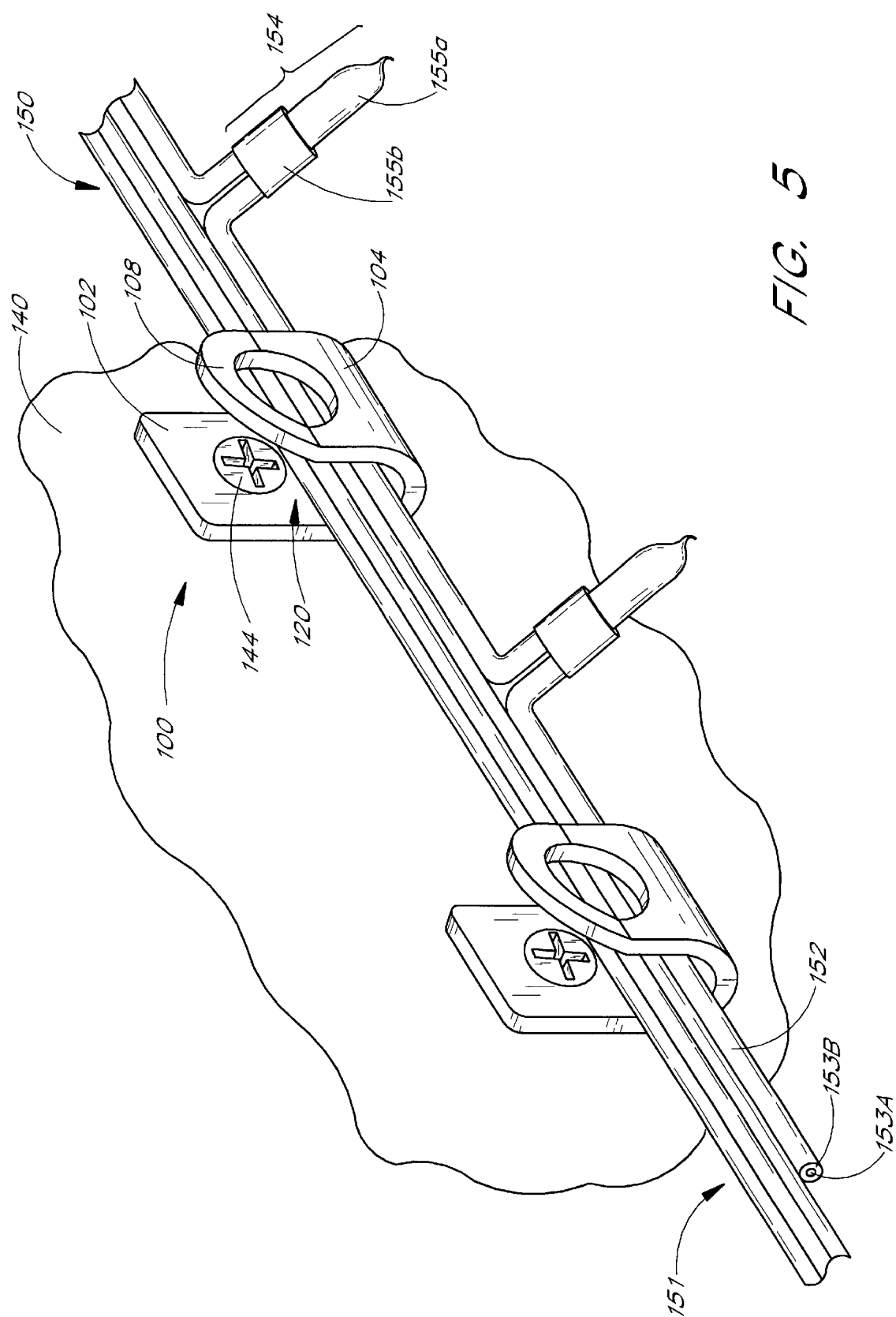
FIG. 5 is a perspective view of the light strand hangers with a typical light strand installed.

FIG. 5 illustrates two light strand hangers 100 secured to the mounting surface 140, with a light strand 150 installed. Although the light strand 150 is not part of the present invention, it will be appreciated that the description of the light strand 150 below makes apparent the function and advantages of the preferred embodiment of the present invention.

The light strand 150 comprises a bundle of wires 151 and a plurality of light bulb assemblies 154 spaced apart periodically. The light bulb assembly 154 comprises a light bulb holder 155b and the light bulb 155a referred to above. A single wire 152 in the bundle of wires 151 comprises a conductor 153a and an insulator 153b. Typically, a plurality of the light bulb assemblies 154 are connected in series by a plurality of the single wires 152. The bundle of wires 151 with the light bulb assemblies 154 are typically arranged so as to have the light bulb assemblies 154 spaced out substantially evenly to form the light strand 150. The bundle of wires 151 are typically intertwined to make the light strand 150 easier to handle. A plurality of light strands 150 can be connected together to form a longer light strand.

As seen in the preferred embodiment of the present invention in FIG. 5, the light strand 150 is inserted into the securing section 120 of the recess 110 from the top. It will be appreciated that the flanged upper end of the second leg 108 aids in the insertion of the light strand 150 into the recess 110. Furthermore, the upper end of the second leg 108 is rounded to prevent damages to the insulator 153b in the light strand 150 during insertion of the light strand 150 into the recess 110. The recess 110 is sized such that once the light strand 150 is urged into the securing section 120 of the recess 110, the fit is sufficiently tight so as to frictionally prevent the light strand 150 from twisting. This secure hold on the light strand 150 allows the user to install the light strand 150 such that the light bulbs 155a are positioned in a preferred orientation. Furthermore, that orientation is maintained by the frictional engagement between the light strand 150 and the inner surface of the securing section 120 in the light strand hanger 100. A plurality of light strand hangers 100 can be installed periodically to allow the user to hang long lengths of the light strand 150.

It will be appreciated that the light strand hangers 100 provide the user with significant advantages while offering little or no significant drawbacks. In particular, the light strand hangers 100 allow the user to hang light strands 150 so that the light bulbs 155a are positioned in a preferred orientation for enhanced appearance. Furthermore, the shape of the upper end of the second leg 108 allows easy installation of the light strand 150 into the light strand hanger 100, while preventing damages to the insulation 153b in the light strand 150.

Although the foregoing description of the preferred embodiment of the present invention has shown, described and pointed out the fundamental novel features of the invention, it will be understood that various omissions, substitutions and changes in the form of the detail of the apparatus as illustrated as well as the uses thereof, may be made by those skilled in the art without departing from the spirit of the present invention. Consequently, the scope of the invention should not be limited to the foregoing description, but should be defined by the appending claims.

What is claimed is:

1. A light strand hanger comprising:

a fastener having a shaft and a head;

a first leg that extends in a first direction and a first distance has a first and second end and defines a first opening positioned adjacent the first end that is sized to receive the shaft of the fastener such that the fastener can be extended therethrough so as to secure the first leg to the structure;

an interconnecting section that is attached to the first leg at the second end and extends in a second direction having a component perpendicular to the first direction;

a second leg having a first and a second end wherein the first end is attached to the interconnecting section so that the second leg extends in a third direction substantially parallel to the first direction for a distance substantially equal to the first distance so as to define a recess between the first and second legs wherein the recess is sized so as to receive a light strand such that the inner surfaces of the first and second legs frictionally engage with the light strand so as to inhibit the light strand from twisting wherein the second leg includes an opening that is positioned with respect to the opening in the first leg such that the head of the fastener can be extended through the opening in the second leg into the opening in the first leg wherein the opening in the second leg is sized so as to allow a portion of the tool to engage the fastener and urge the fastener into the structure to secure the first leg to the structure and wherein the recess and openings are sized and positioned such that the light strand can be removed from the recess without removal of a fastener from the openings in the first and second legs.

2. The light strand hanger of claim 1, wherein the fastener is preferably a screw having a threaded portion and a head and wherein the opening in the first leg is sized to allow the threaded portion of the screw to pass through and prevent the head of the screw from passing through.

3. The light strand hanger of claim 2, wherein the opening in the first leg is countersunk and the screw has a tapered flat head so as to provide a flush fit of the head of the screw with the first leg.

4. The light strand hanger of claim 2, wherein the opening in the second leg is sized to allow the fastener to pass through.

5. The light strand hanger of claim 4, wherein the head of the screw can pass through the opening in the second leg.

6. The light strand hanger of claim 1, wherein the opening in the second leg is sized to allow a tip of the tool to pass through.

7. The light strand hanger of claim 6, wherein the tip of a screwdriver can pass through the opening in the second leg.

8. The light strand hanger of claim 1, wherein the second leg is flanged outward so as to facilitate insertion of the light strand into the recess.

9. The light strand hanger of claim 8, wherein the end of the flanged second leg is rounded so as to prevent damage to the light strand during insertion into the recess.

10. The light strand hanger of claim 1, wherein the frictionally secured light strand is inhibited from twisting so as to allow the lights on the light strand to maintain their preferred orientations.

11. A method of securing a strand of lights having at least one conductor and a plurality of lights extending in a first direction therefrom to a surface of a building, the method comprising:

(i) positioning a first leg of a retainer against the surface of the building in a first orientation such that the first and a second leg of the retainer extend in an upward direction so that an opening to a space between the first and second legs is positioned upward of an interconnection between the first and second legs of the retainer;

(ii) extending a fastener through an opening in both the first leg and a second leg of the retainer;

(iii) extending a tool through the opening in the first leg such that the tool engages the fastener;

(iv) securing the fastener to the surface of the building such that the first leg is secured to the surface of the building so as to secure the retainer in the first orientation;

(v) positioning the strand of lights in the space between the first leg and the second leg such that the strand of lights is frictionally retained in the space by the first and second legs of the retainer in a manner that inhibits rotation of the strand of light such that the adjacent lights are substantially maintained in the first orientation and so that the strand of lights can be removed from the space without removal of the fastener from the openings in the first or second legs; and (vi) repeating acts (i) through (v) in a plurality of times at intervals along the strand of lights.

12. The method of claim 11, wherein extending the fastener comprises extending a screw through the openings in the first leg and the second leg.

13. The method of claim 11, wherein extending the tool comprises extending a screwdriver through the opening in the second leg so as to engage the screw.

14. The method of claim 11, wherein securing the fastener comprises securing the screw to the surface of the building.

15. The method of claim 14, wherein securing the screw comprises screwing the screw to the surface of the building.

* * * * *